United States Patent
Wang et al.

(10) Patent No.: US 7,737,221 B2
(45) Date of Patent: Jun. 15, 2010

(54) POLYMER COMPOSITION

(75) Inventors: Yundong Wang, Lancaster, MA (US);
Ryszard Brzoskowski, Acton, MA (US)

(73) Assignee: DSM IP Assets B.V., Heerlen (NL)

( * ) Notice: Subject to any disclaimer, the term of this patent is extended or adjusted under 35 U.S.C. 154(b) by 0 days.

(21) Appl. No.: 10/566,280

(22) PCT Filed: Jul. 28, 2004

(86) PCT No.: PCT/NL2004/000542

§ 371 (c)(1),
(2), (4) Date: Jun. 15, 2006

(87) PCT Pub. No.: WO2005/010094

PCT Pub. Date: Feb. 3, 2005

(65) Prior Publication Data

US 2006/0241234 A1 Oct. 26, 2006

Related U.S. Application Data

(60) Provisional application No. 60/490,522, filed on Jul. 29, 2003.

(51) Int. Cl.
*C08L 23/08* (2006.01)
*C08L 23/16* (2006.01)
*C08L 9/00* (2006.01)

(52) U.S. Cl. .................. 525/240; 525/232; 524/490

(58) Field of Classification Search .............. 525/416, 525/236, 232, 240, 210, 490
See application file for complete search history.

(56) References Cited

U.S. PATENT DOCUMENTS

| | | | |
|---|---|---|---|
| 4,607,074 A * | 8/1986 | Hazelton et al. | 524/425 |
| 5,187,224 A * | 2/1993 | Hamanaka et al. | 524/505 |
| 5,349,005 A * | 9/1994 | Tanaka | 524/490 |
| 6,437,030 B1 | 8/2002 | Coran et al. | 524/101 |
| 6,750,292 B2 * | 6/2004 | Dozeman et al. | 525/191 |
| 2005/0215717 A1 * | 9/2005 | Dozeman | 525/192 |
| 2006/0216019 A1 * | 9/2006 | Thompson | 396/427 |

FOREIGN PATENT DOCUMENTS

| | | |
|---|---|---|
| EP | 0 757 077 | 2/1997 |
| EP | 757 077 A1 * | 2/1997 |
| WO | WO 03/031150 | 4/2003 |

OTHER PUBLICATIONS

International Search Report, Oct. 22, 2004.

* cited by examiner

*Primary Examiner*—David Wu
*Assistant Examiner*—Rip A. Lee
(74) *Attorney, Agent, or Firm*—Nixon & Vanderhye P.C.

(57) ABSTRACT

Thermoplastic elastomer composition, comprising an thermoplastic polyolefin and an dynamically vulcanized elastomer comprising monomer units of ethylene, an α-olefin and optionally one or more non-conjugated polyenes and oil, having an oil/elastomer ratio of at least 2/1, having a content of thermoplastic polyolefin of less than 10 wt. % relative to the total weight of the thermoplastic elastomer composition, granulate of the composition having the capability of flowing out of a cylinder, held in vertical position, within 120 seconds, after being kept in that cylinder under a pressure of 465 kg/m2, at a temperature of 50° C., for a period of 1 hour, that cylinder having an internal diameter of 95.3 millimeter (mm) and a length of 356 mm and being filled for a length of between 326 and 338 mm.

19 Claims, No Drawings

POLYMER COMPOSITION

This application is the US national phase of international application PCT/NL2004/000542 filed 28 Jul. 2004 which designated the U.S. and claims benefit of U.S. 60/490,522, dated 29 Jul. 2003, the entire content of which is hereby incorporated by reference.

The invention relates to a thermoplastic elastomer composition comprising an thermoplastic polyolefin and an dynamically vulcanized elastomer comprising monomer units of ethylene, an α-olefin and optionally one or more non-conjugated polyenes, the composition having a low hardness.

In EP-A-436724 a thermoplastic elastomer having a hardness below 50 Shore A has been described. The thermoplastic elastomer composition is obtained by feeding a copolymer rubber and a thermoplastic polyolefin through a hopper into a cylinder of an extrusion machine and feeding through an inlet separately from the hopper into the extruder a mineral oil type softener in combination with silicone oil whereby the mixture is heat-treated in the presence of an organic peroxide.

A problem of the known thermoplastic elastomer having a low hardness, is that the composition shows a high stickiness. This for example results in granulate of the composition to stick together, when it is kept on stock, for example when stacked up in sacks, bags, gaylords, cartons, or kept in a silo. Once the granulate sticks together it is no longer possible to transport the granulate into the feed opening of an extruder. It is possible that the granulate sticks together to form large clumps of agglomerated granules. It is even possible that an entire sack, bag, gaylord, carton, or silo is filled with a mass of granules all or virtually all sticking together.

The object of the present invention is to provide a thermoplastic elastomer composition having a low hardness, not having the high stickiness.

This object is achieved in that a thermoplastic elastomer composition is provided comprising composition comprising an thermoplastic polyolefin and an dynamically vulcanized elastomer comprising monomer units of ethylene, an α-olefin and optionally one or more non-conjugated polyenes and oil, having an oil/elastomer ratio of at least 2/1, having a content of thermoplastic polyolefin of less than 10 wt. % relative to the total weight of the thermoplastic elastomer composition, granulate of the composition having the capability of flowing out of a cylinder, held in vertical position within 120 seconds, after being kept in that cylinder under a pressure of 465 kg/m2, at a temperature of 50° C., for a period of 1 hour (hr), that cylinder having an internal diameter of 95.3 millimeter (mm) and a length of 356 mm, the cylinder being filled over a length between 326 and 338 mm.

Granulate of the thermoplastic elastomer according to the invention shows much less tendency to stick or to block, so that it can be stored in sacks, bags, gaylords, cartons, or silos without the problems of the known thermoplastic elastomers with the low hardness, easily be transported, for example by automatic pneumatic equipment, sometimes used for transporting the granulate from the silo to the processing equipment. In this way for the first time modern industrial processing and so commercial application of this class of thermoplastic elastomers will be possible.

A further advantage of the thermoplastic elastomer composition according to the invention is that shaped objects of the composition show a very smooth surface, so that the composition is very well suited for so called "soft touch" applications, like grips, buttons etc.

Yet a further advantage of the thermoplastic elastomer composition according to the present invention, is that the composition has a low viscosity, so that it can easily be processed to shaped objects, especially by injection molding.

Yet a further advantage of the thermoplastic elastomer composition according to the present invention, is that the composition is very well suited to be used as an impact modifier in a thermoplastic polymer.

Examples of the thermoplastic polyolefin suitable to be used in the thermoplastic elastomer composition according to the invention are homopolymers of ethylene or propylene, copolymers of ethylene and propylene, copolymers of ethylene and an α-olefin co monomer with 4-20 carbon atoms or copolymers of propylene and an α-olefin co monomer with 4-20 carbon atoms. In case of a copolymer of propylene and an alpha-olefin co monomer with 4-20 carbon atoms, the content of the propylene monomer units in said copolymer is preferably at least 75 wt. %. The thermoplastic polyolefin homo- and copolymers may be prepared with a Ziegler-Natta catalyst, a metallocene catalyst or with another single site catalyst.

Preferably, polypropylene, polyethylene or mixtures thereof are used as thermoplastic polyolefin. More preferably polypropylene is used as thermoplastic polyolefin. Most preferably a polypropylene homopolymer is used.

The Melt flow rate (MFR) of the polypropylene preferably is between 0.3 and 50 (grams/10 minutes); more preferably between 0.5 and 20 (according to ISO norm 1133 (230° C.; 2.16 kg load)).

The amount of thermoplastic polyolefin is less than 10% by weight relative to the total weight of the thermoplastic elastomer composition. Preferably the amount is less than 8, % by weight, more preferably less than 6% by weight relative to the total weight the thermoplastic elastomer composition, still more preferably less than 5% by weight relative to the total weight the thermoplastic elastomer composition most preferably less than 4% by weight relative to the total weight the thermoplastic elastomer composition. Preferably the amount of thermoplastic polyolefin is above 2% by weight relative to the total weight the thermoplastic elastomer composition.

A thermoplastic elastomer composition comprising a dynamically vulcanized elastomer is also known as thermoplastic vulcanization (TPV). The elastomer used in the thermoplastic elastomer composition of the present invention comprises monomer units of ethylene, an α-olefin and optionally one or more non-conjugated polyenes. The elastomer may comprise as the α-olefin an α-olefin comprising from 4-20 carbon atoms. Examples of the α-olefins are propylene, butylene, hexene, octene and the like. Preferably propylene is used. The weight ratio between ethylene and the α-olefin in the elastomer preferably is between 90/10 and 20/80, more preferably between 70/30 and 40/60. Preferably the elastomer used in the thermoplastic elastomer composition according to the invention comprises a non-conjugated polyene. This enables very well a controlled dynamic vulcanization.

Examples of non-conjugated polyenes that may be used in the elastomer are 5-ethylidene norbornene (ENB), 5-vinyl-2-norbornene (VNB), dicyclopentadiene (DCPD) and 1,4 hexadiene. It is also possible that the elastomers comprised two or more different polyenes, for example ENB and VNB.

Preferably the elastomer, comprising also the polyene, comprises 1-12 weight % of the polyene, more preferably 2-10 weight %.

The thermoplastic elastomer composition according to the invention may comprise any oil known to be suitable for use in thermoplastic vulcanizates (TPV's). Examples of suitable oils are paraffinic oil, naphthalenic oil and aromatic oil. Most suitable are very pure paraffinic oils, also indicated as white oils. The best suited of these is paraffinic oil prepared by the so-called isocracking and dewaxing process, developed by Chevron.

The oil/elastomer ratio in the thermoplastic elastomer composition according to the invention is at least 2/1, advantageously at least 2.1/1, preferably at least 2.5/1, more preferably at least 3/1, and most preferably at least 3.5/1.

Granulate of the composition according to the invention has the capability of flowing out of a cylinder, held in vertical position, within 120 seconds, preferably within 60 seconds, more preferably within 30 seconds, still more preferably within 15 seconds, after being kept in that cylinder under a pressure of 465 kg/m2, at a temperature of 50° C., for a period of 1 hour, preferably for a period of 24 hours, still more preferably for a period of 24 hours, that cylinder having an internal diameter of 93.5 millimeter (mm) and a length of 356 mm, being filled for a length of between 326 and 338 mm.

The thermoplastic elastomer composition according to the invention preferably has a hardness below 35 shore A, more preferably below 30, still more preferably below 25.

Preferably the thermoplastic elastomer composition of the present invention shows a shear viscosity of less than 300 Pa·s, as measured in a capillary viscometer at a shear rate of 207 s-1, and a temperature of 200° C. Most preferably the composition shows a shear viscosity of 200 Pa·s, measured under the same conditions.

Extruded objects of the thermoplastic elastomer composition according to the invention may show a very smooth surface, for example having a smoothness as expressed Ra of less than 5 micrometer, as measured by a model 211 Surftest surface roughness tester with 4 mN (0.4 gf) measuring force with a cutoff length setting of 0.8 mm, manufactured by Mitutoyo Corporation of Japan. Preferably the smoothness is less than 3 microns.

The thermoplastic elastomer composition according to the present invention may also comprise usual further components, for example reinforcing and non-reinforcing fillers, antioxidants, stabilizers, antistatic agents, lubricants, foaming agents, pigments, flame retardants. Examples of fillers that may be used are calcium carbonate, clay, silica, talc, titanium dioxide, carbon black and inorganic nano particles.

The present invention also relates to a process for the preparation of the thermoplastic elastomer composition according to the present invention.

Dynamic vulcanization comprises the steps of kneading a mixture comprising at least the thermoplastic polyolefin and the elastomer, and vulcanizing the elastomer while kneading The thermoplastic elastomer composition of the present invention may be prepared by preparing the composition in one step, by adding the thermoplastic polyolefin, the elastomer, the oil and a vulcanizing agent at the same time to a batch mixer, or at the same place to a continuous mixer. However the thermoplastic elastomer composition according to the present invention may also be prepared by first kneading the molten thermoplastic polyolefin and the elastomer, hereafter kneading is continued and the vulcanizing agent is added so that dynamic vulcanization takes place.

The oil may for example be added before and/or during and/or after the dynamic vulcanization. Preferably the oil is added before and during the dynamic vulcanization. Most preferably the oil is added during the dynamic vulcanization in two or more portions. In a batch process the oil is added in different portions during different stages of the mixing cycle. In the extruder the oil is fed at two or more spots having each at a different distance downstream from the feed opening. The preparation of the thermoplastic elastomer composition of the present invention may be carried out in conventional mixing equipment for example roll mills, Banbury mixers, Brabender mixers, continuous mixers for example a single screw extruder, a twin screw extruder and the like. Preferably the process is carried out in a twin screw extruder.

As vulcanizing agent a phenolic resin, a peroxide, a silicon containing curative or a borane may be used. Good results are obtained if from 0.5-5.0 parts of a phenolic resin are used per 100 parts of elastomer. Preferably 0.5-3.0, more preferably 1-2 parts of phenolic resins are used. It is important that to use a sufficient amount of curing agent, so that the granulate is not sticky. If too much curing agent is used, the composition according to the invention has too rough surface or bad morphology. Preferably an amount of curing agent is used, so that the surface roughness Ra<10, preferably <7, more preferably <5.

Examples of suitable phenolic resins are octyl-phenol formaldehyde curing resins. Commercial resins of this kind are for example Ribetak R7530E (delivered by CECA-Ato in France or SP1045 (delivered by Schenectady in US).

The temperature of the composition leaving the mixer is preferably between 200 and 260° C.

If a vulcanization agent, different from the phenolic resin is used, it is important to select the amount of vulcanization agent, the temperature and the residence time so that the same or a comparable dynamic vulcanization rate is obtained.

The degree of dynamic vulcanization of the elastomer in the thermoplastic elastomer composition according to the invention is preferably between 80 and 98%, more preferably between 82 and 96%, more preferably 84 and 94%.

The degree of vulcanization of the elastomer is expressed in terms of gel content. Gel content is the ratio of the amount of non-soluble elastomer and the total amount of elastomer (in weight) of a specimen soaked in an organic solvent for the elastomer. The method is described in U.S. Pat. No. 5,100,947.

The invention also relates to granulate of the thermoplastic elastomer composition according to the invention. The granulate particles may have a diameter between 1.5 and 10 mm, preferably between 2 and 6 mm.

The invention also relates to shaped articles comprising the thermoplastic elastomer composition according to the invention. Good examples are shaped articles obtained by extrusion or injection molding. Preferred are shaped articles obtained by injection molding, preferred examples of those are grips, gaskets, floor mats. The invention also relates to a mixture comprising the thermoplastic elastomer composition according to the invention and a further thermoplastic polymer. In this process the further thermoplastic polymer is impact modified or softened by the thermoplastic elastomer composition according to the invention. Examples of suitable further thermoplastic polymers are thermoplastic polyolefins, preferably polypropylene homopolymer or copolymer are used, and most preferably a polypropylene block copolymer is used. It is possible that the further thermoplastic polymer is the same thermoplastic polymer that is part of the thermoplastic polymer composition according to the invention; it is also possible that the further thermoplastic polymer is different. Also good results are obtained if the further thermoplastic polymer is a nylon a polyester or PPO, which may be modified for polyvinyl chloride replacement. Good results are obtained if a mixture is obtained comprising 5-30 wt. % of the thermoplastic elastomer composition according to the invention and 95-70 wt. % of the further thermoplastic polymer. Suitable applications for the mixture comprising the thermoplastic elastomer composition according to the invention and the further thermoplastic polymer are bumpers, fascias, and automotive interior parts.

In another embodiment a relative small amount of a further thermoplastic polymer is mixed with the thermoplastic elastomer composition according to the invention, for example a mixture is produced comprising 5-50 wt. % of further thermoplastic polymer and 95-50 wt. % of the thermoplastic elastomer composition. Preferably in this case both the thermoplastic polymer of the thermoplastic polymer composition and the further thermoplastic polymer are both polypropylene.

Test Methods

Test Method for Anti-Blocking Properties

Granulate is preheated in a hot air circulation oven, air temperature 50° C., so that the temperature of the granulate is 50° C. (normally this is for a period of 30 minutes).

The granulate is placed, by pouring, in a steel tube (304L stainless steel welded tubing by Bristol in the US, ASTM A-312/SA-312), having a length of 356 mm, an inside diameter of 95.3 mm. The amount of granulate poured into the cylinder is chosen so that the length over which the cylinder is filled with the granulate is between 326 and 338 mm. The cylinder being placed with the axis of the cylinder in vertical direction in a steel pan. Cylinder and pan were preheated at 50° C. as well. After the granulate is poured in the cylinder a cylinder shaped pine plug is placed in the cylinder on top of the granulate. The pine plug has a diameter of 94 mm a thickness of 38.1 mm and a weight of 110 grams. On top of the plug, in the center of the plug, a weight is placed of 3.21 kg (weight and plug together is 3.32 kg). Than cylinder, still standing in vertical position in the pan, is placed in a hot air circulation oven at 50° C. for the prescribed time (for example 1, 24 or 48 hours). The time between taking the granulate out of the oven and placing the cylinder in the oven does not exceed 120 seconds.

After that period the cylinder and pan are taken out of the oven. The weight and the plug are removed and the cylinder is lifted from the pan in about 1 sec to a height of about 300 mm.

The lifting of the cylinder is within 60 seconds, after the cylinder was taken out of the oven.

Than the time needed for all the granulate to flow out of the cylinder is measured, starting at the moment initiating the lifting.

Test Method for Surface Roughness

The surface roughness of extruded strips was measured by using a model 211 Surftest surface roughness tester with 4 mN (0.4 gf) measuring force, manufactured by Mitutoyo Corporation of Japan. The cutoff setting was 0.8 mm.

COMPARATIVE EXPERIMENT A, EXAMPLES I-IV

Thermoplastic elastomer compositions were produced having the composition as defined in table 1.

Keltan™ P597 is a mixture comprising 100 parts elastomer of ethylene, propylene and a polyene, 100 parts of oil. Keltan P597 is delivered by DSM in the Netherlands. PP1012 is a polypropylene homopolymer, delivered by Amoco in the US. For further components see table 1.

The samples were prepared in a ZE 40A Berstorff intermeshing co-rotating twin screw extruder (43 UD) by melt mixing and kneading Keltan P597™ (50 wt % oil-extended EPDM from DSM) as elastomer, polypropylene homopolymer PP 1012™ (BP Amoco in the United States, MFR=1.2 g/10 min) as thermoplastic polymer, additional processing oil Pennzultra 1199 ™ (Pennzoil in the United States), and additive package. The additional processing oil was injected at multiple locations along the extruder. The additive package contained phenolic curative SP1045™ (Schenectady International Inc. in the United States), stannous chloride dihydrate (TH. Goldschmidt AG in Germany), zinc oxide (Zinc Corporation of America in the United States), heat stabilizer Irganox 1076 (Ciba Geigy Corporation in the United States), talc Cimpact 610 (Luzenac America Inc. in the United States), and zinc stearate (Witco in the United States). The melt temperature was in the range of 205 to 235° C. Granulate having a diameter of 3 mm was produced. Stickiness of the granulate was measured (see table 2)

The samples were injection molded plates of a thickness of 2 mm using a state of the art injection molding machine. From the plates mechanical properties were measured as indicated in table 2.

A 50 mm wide, 1 mm thick strip was extruded at a temperature of 220°. The surface roughness of the strip was measured (see table 2).

In comparative experiment A not enough curing agent was used, so that the granulate was sticky. The granulate of the examples I-IV was not sticky, while the composition shows favorable values for hardness and mechanical properties, surface roughness etc.

TABLE 1

Composition of samples in phr (parts per 100 parts EPDM)

| Recipe (phr) | example/comp. Ex. | | | | |
|---|---|---|---|---|---|
| | I | II | A | III | IV |
| Keltan P597 (100 phr EPDM, 100 phr oil) | 200 | 200 | 200 | 200 | 200 |
| Polypropylene (Amoco PP1012) | 23 | 23 | 23 | 23 | 23 |
| Talc (Cimpact 610) | 19 | 19 | 19 | 19 | 19 |
| Anti oxidant (Irganox 1076) | 1.2 | 1.2 | 1.2 | 1.2 | 1.2 |
| Zinc Stearate | 1.0 | 1.0 | 1.0 | 1.0 | 1.0 |
| Zinc Oxide | 3.0 | 3.0 | 3.0 | 3.0 | 3.0 |
| Stannous Chloride Dihydrate | 1.0 | 1.0 | 1.0 | 1.0 | 1.0 |
| Phenolic Resin (SP1045) | 1.0 | 1.2 | 0.3 | 0.8 | 1.4 |
| Oil (Pennzultra 1199) | 110 | 150 | 200 | 200 | 200 |
| Total | 359.2 | 399.4 | 448.5 | 449.0 | 449.6 |
| PP content, wt % of composition | 6.40 | 5.76 | 5.13 | 5.12 | 5.12 |
| Total oil in phr per 100 phr EPDM | 210 | 250 | 300 | 300 | 300 |
| Oil/EPDM ratio | 2.1/1 | 2.5/1 | 3/1 | 3/1 | 3/1 |

TABLE 2

| Property | ISO Method | example/comp. Ex. | | | | |
|---|---|---|---|---|---|---|
| | | I | II | A | III | IV |
| 4 × 6 injection molded plaques (fan gated) | | | | | | |
| Hardness, Shore A pts. 15 s delay | ISO 868 | 38.9 | 34.3 | 20.6 | 20.2 | 25.9 |
| Specific Gravity | ISO 1183 | 0.93 | 0.91 | 0.94 | 0.92 | 0.93 |

TABLE 2-continued

| Property | ISO Method | example/comp. Ex. | | | | |
|---|---|---|---|---|---|---|
| | | I | II | A | III | IV |
| Tensile Strength-perp, MPa | ISO 37 | 2.4 | 1.7 | 0.9 | 0.9 | 1.0 |
| 100% Modulus-perp, MPa | ISO 37 | 0.9 | 0.7 | 0.4 | 0.5 | 0.6 |
| Ultimate Elongation-perp, % | ISO 37 | 362.0 | 285.0 | 513.0 | 227.0 | 185.0 |
| App. visc. @206 1/s & 200° C., Pa · s | ASTM D3835 | 212.0 | 192.0 | 79.0 | 87.0 | 119.0 |
| Anti-Blocking Properties* | see patent spec. | | | | | |
| 1 hr @50° C., time required to fall out of tube, s. | | 3 | 2 | stuck | 13 | 2 |
| 48 hrs@50° C., time required to fall out of tube, s. | | 25 | 14 | stuck | stuck | 13 |
| Surface Roughness of Extruded Strip | see patent spec. | | | | | |
| Ra, micrometer | | 1.6 | 2.4 | 3.3 | 3.2 | 2.3 |
| Ry, micrometer | | 11.9 | 14.0 | 19.6 | 20.1 | 13.6 |

The invention claimed is:

1. Thermoplastic elastomer composition consisting of:
a thermoplastic polyolefin,
a dynamically vulcanized elastomer consisting of monomer units of ethylene, an α-olefin and optionally one or more non-conjugated polyenes and oil,
0.5 to 3.0 parts per 100 parts of elastomer of a phenolic resin vulcanizing agent, and
optionally at least one additive selected from the group consisting of fillers, antioxidants, stabilizers, antistatic agents, lubricants, foaming agents, pigments and flame retardants, wherein
the composition has an oil/elastomer ratio of at least 2.1/1 and a content of thermoplastic polyolefin of less than 10 wt % relative to the total weight of the thermoplastic elastomer composition, and a hardness of below 35 Shore A at a delay time of 15 seconds, and wherein
granulate of the composition is capable of flowing out of a cylinder, held in vertical position, within 120 seconds, after being kept in the cylinder under a pressure of 465 kg/m², at a temperature of 50° C., for a period of 1 hour, the cylinder having an internal diameter of 95.3 millimeter (mm) and a length of 356 mm and being filled for a length of between 326 and 338 mm.

2. Thermoplastic elastomer composition according to claim 1, wherein the granulate is kept in the cylinder for 24 hours.

3. Thermoplastic elastomer composition according to claim 1, wherein the granulate is kept in the cylinder for 48 hours.

4. Thermoplastic elastomer composition according to claim 1, wherein the granulate is capable of flowing out of the cylinder within 60 seconds.

5. Thermoplastic elastomer composition according to claim 1, wherein the granulate is capable of flowing out of the cylinder within 30 seconds.

6. Thermoplastic elastomer composition according to claim 1, wherein the granulate is capable of flowing out of the cylinder within 15 seconds.

7. Thermoplastic elastomer composition according to claim 1, wherein the thermoplastic polyolefin is polypropylene.

8. Thermoplastic elastomer composition according to claim 1, wherein the thermoplastic elastomer composition has a degree of curing between 80 and 98%.

9. Thermoplastic elastomer composition according to claim 1, wherein the thermoplastic elastomer composition has a surface smoothness Ra of less than 10 microns.

10. Thermoplastic elastomer composition according to claim 1, wherein the thermoplastic elastomer composition has a surface smoothness Ra of less than 5 microns.

11. Thermoplastic elastomer composition according to claim 1, wherein α-olefin monomer is at least one selected from the group consisting of propylene, butylene, hexane, and octene.

12. Thermoplastic elastomer composition according to claim 11, wherein the elastomer consists of monomer units of ethylene, an α-olefin and one or more non-conjugated polyenes selected from the group consisting of 5-ethylidene norbornene, 5-vinyl-2-norbornene, dicyclopentadiene and 1,4-hexadiene.

13. Thermoplastic elastomer composition according to claim 1, wherein the composition has an oil/elastomer ratio of at least 2.5/1.

14. Thermoplastic elastomer composition according to claim 1, wherein the composition has an oil/elastomer ratio of at least 3/1.

15. Thermoplastic elastomer composition according to claim 1, wherein the composition has a hardness of below 30 Shore A at a delay time of 15 seconds.

16. Thermoplastic elastomer composition according to claim 1, wherein the composition has a hardness of below 25 Shore A at a delay time of 15 seconds.

17. Thermoplastic elastomer composition according to claim 1, wherein the phenolic resin vulcanizing agent is present in an amount of 0.5 to 2 parts per 100 parts of elastomer.

18. Thermoplastic elastomer composition according to claim 1, wherein the phenolic resin vulcanizing agent is present in an amount of 1 to 2 parts per 100 parts of elastomer.

19. Mixture comprising the thermoplastic elastomer composition according to claim 1 and a further thermoplastic polymer.

* * * * *